Figure 1:
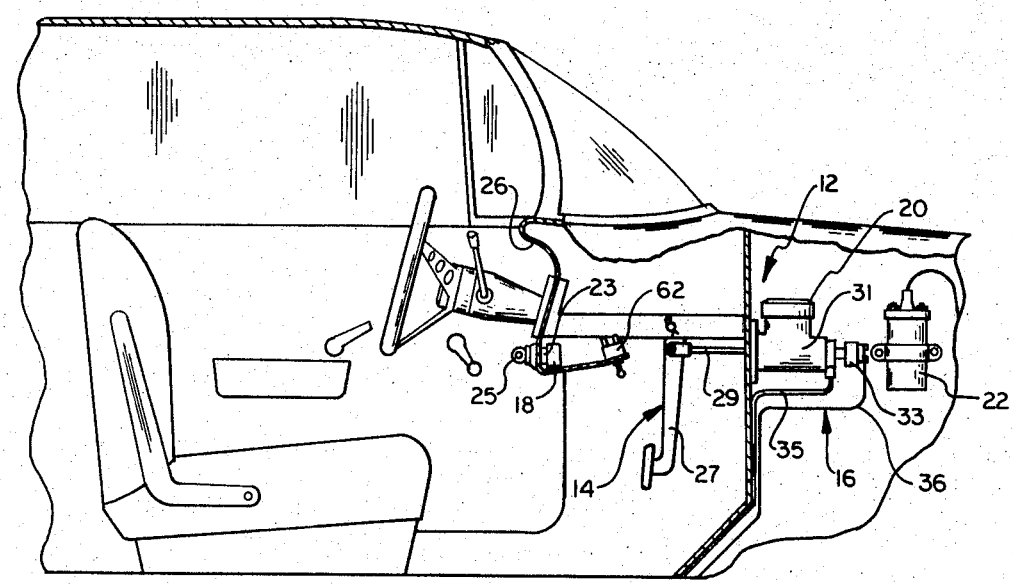

United States Patent [19]

Obermeit

[11] 3,850,260
[45] Nov. 26, 1974

[54] AUTO WARM-UP THEFT PREVENTING APPARATUS

[76] Inventor: Gerhard E. Obermeit, 500 S. King St., Mount Hope, Kans. 67108

[22] Filed: Feb. 12, 1973

[21] Appl. No.: 331,579

[52] U.S. Cl. ............... 180/114, 307/10 AT, 340/63
[51] Int. Cl. ............................................ B60r 25/08
[58] Field of Search ..................... 180/114; 340/63; 307/10 AT

[56] References Cited
UNITED STATES PATENTS

| | | | |
|---|---|---|---|
| 1,561,194 | 11/1925 | Stimson | 307/10 AT |
| 3,194,970 | 7/1965 | Claps | 307/10 AT |
| 3,525,414 | 8/1970 | Copelan | 307/10 AT |
| 3,593,273 | 7/1971 | Teich | 307/10 AT |
| 3,703,703 | 11/1972 | Payne | 340/63 |

Primary Examiner—David Schonberg
Assistant Examiner—Jack D. Rubenstein
Attorney, Agent, or Firm—Phillip A. Rein

[57] ABSTRACT

This invention is an auto warm-up theft preventing apparatus operable to de-energize the ignition system of a vehicle on the depression of the brake pedal to cease non-authorized movement of the vehicle. More particularly, this invention is a theft preventing apparatus having a mechanical means inter-connected by an electrical circuit means whereupon the ignition system is controlled through a concealed switch and a pair of relay members to energize the ignition circuit and operable on opening of the concealed switch member to de-energize the ignition system circuit on depression of the brake switch.

4 Claims, 2 Drawing Figures

PATENTED NOV 26 1974 3,850,260

AUTO WARM-UP THEFT PREVENTING APPARATUS

Numerous structures are noted in the prior art which are operable in various complex manners to de-energize the ignition circuit of a vehicle and sound off alarms to prevent non-authorized movement of the subject vehicle. Additionally, numerous structures are utilized to cease the flow of fuel and de-energize the ignition system but the prior art structures are very complicated in nature; expensive to manufacture; subject to numerous points of failure; and unsafe for normal usage.

In one preferred embodiment of this invention, an auto warm-up theft preventing apparatus is provided including a mechanical means inter-connected by an electrical circuit means. The mechanical means comprises first an ignition switch; a brake assembly; and an ignition assembly. The ignition switch is of a substantially standard structure being operated by a key member used for controlling operation of the vehicle. The brake assembly includes a pedal assembly operably connected to a master cylinder and brake switch. The brake assembly is operable in a substantially conventional manner on depression thereof to activate the master cylinder to supply pressure fluid to slave cylinders for braking purposes. The brake switch is of a substantially conventional nature mounted on the master cylinder and operable to energize the electrical circuit to the brake lights on the vehicle. The ignition assembly includes a coil member interconnected by various wires to the distributor and, in turn, to the spark plug members so as to energize the same on proper actuation of the ignition switch in a conventional manner. The electrical circuit means includes a power supply; a control circuit connected to the power supply; and an ignition circuit connected to the control circuit. The power supply includes a battery member connected to ground and additionally connected through a conduit line to the ignition switch. The ignition switch is normally a key operated switch which, without the key, is in a normally opened condition to prevent non-authorized movement of the vehicle. The ignition switch is connected by a line to the control circuit when placed in a closed condition. The control circuit includes a concealed switch member connected on both sides thereof by electrical lines to a normally opened relay which, in the closed condition, operates through a conduit line to energize the ignition circuit. The control circuit further includes a normally closed relay connected to a coil of the normally opened relay for closing the same and further connected through a line to a normally opened switch connected to the brake switch. The normally opened relay is held in the closed condition when the concealed switch member is closed for normal vehicle operation to energize the ignition circuit. After starting of the vehicle, the concealed switch member may be opened whereupon the normally opened relay is still held in the closed condition by the normally closed contacts of the normally closed relay. However, on actuation of the brake switch member, the normally closed relay opens and releases power to the normally opened relay to open the same and ceases electrical power through the ignition circuit to the coil member and disables the vehicle so that movement is ceased until the concealed switch member is closed.

One object of this invention is to provide an auto warm-up theft preventing apparatus readily attachable in a vehicle ignition system and operable on normal depression of a brake assembly to de-energize the ignition system and render the vehicle inoperable.

Another object of this invention is to provide an auto warm-up theft preventing apparatus having concealed switch means therewith operable after starting the vehicle so as to place the theft preventing apparatus in operation while permitting the vehicle engine to continue running but de-energize the system on depression of the brake assembly by one not authorized to move the vehicle.

Still, another object of this invention is to provide an auto warm-up theft preventing apparatus having a concealed switch member which may be moved at any time to the opened condition whereupon depression of the brake assembly will operate to disable the vehicle to prevent kidnapping attempts and the like.

One further object of this invention is to provide an auto warm-up theft preventing apparatus which can be easily added to existing vehicle ignition systems; is economical to manufacture; reliable in usage; and substantially maintenance free.

Figure 2:
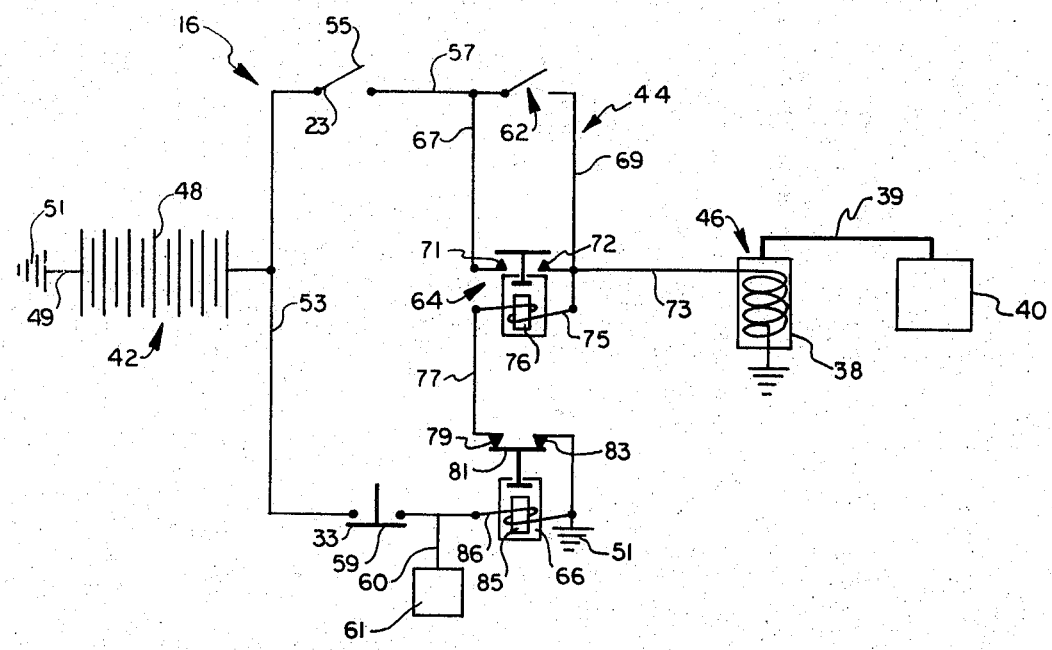

Various other objects, advantages, and features of the invention will become apparent to those skilled in the art from the following discussion, taken in conjunction with the accompanying drawings, in which:

FIG. 1 is a fragmentary sectional elevational view of a vehicle having portions broken away to show the elements of an auto warm-up theft preventing apparatus of this invention; and FIG. 2 is a schematic diagram illustrating the electrical circuit means of the auto warm-up theft preventing apparatus of this invention.

The following is a discussion and description of preferred specific embodiments of the new auto warm-up theft preventing apparatus of this invention, such being made with reference to the drawings, whereupon the same reference numerals are used to indicate the same or similar parts and/or structures. It is to be understood that such discussion and description is not to unduly limit the scope of the invention.

Referring to the drawings in detail and in particularly to FIG. 1, the auto warm-up theft preventing apparatus of this invention, indicated generally at 12, includes a mechanical means 14 inter-connected to an electrical circuit means 16. More particularly, the mechanical means 14 includes an ignition switch 18; a brake assembly 20; and an ignition assembly 22.

The ignition switch 18 includes a first, normally opened switch member 23 which is closed by a key member 25 in a conventional manner and normally mounted on the dashboard 26 of the vehicle as shown in FIG. 1. The key member 25 is normally required as conventional in order to close the switch member 23 for energization of the electrical circuit means 16.

The brake assembly 20 includes a pivotally mounted pedal member 27 connected by a connector rod 29 to a master brake cylinder 31 having a second or brake switch member 33 thereon. The connector rod 29 is normally movable inwardly to move a piston member (not shown) within the master brake cylinder 31 so as to supply pressure fluid through a conduit line 35 to the brake drum assemblies for operation in a conventional manner. Additionally, the movement of the connector rod 29 and piston member operates to close the brake switch member 33 in a conventional manner whereupon the brake lights are energized through an electrical line 36 in a conventional manner.

The ignition assembly 22 includes a coil member 38 interconnected by a connector line or wire member 39 to a distributor assembly 40 which, in turn, is connected by a plurality of wire members (not shown) to respective spark plug members for conventional operation of an internal combustion engine.

As best shown in FIG. 2, the electrical circuit means 16 includes a power supply circuit 42; a control circuit 44 connected to the power supply circuit 42; and an ignition circuit 46 connected to the control circuit 44. The power supply circuit 42 includes a battery member 48 connected by line 49 to ground 51 and connected for the power supply on the opposite side through a line 53 to the ignition switch member 23 and the brake switch member 33. As shown, the ignition switch member 23 has a contact lever 55 shown in the normally opened condition which is conventional and operable to be closed by the key member 25. An output line 57 from the ignition switch member 23 is connected to the control circuit 44. Additionally, the line 53 is connected to the brake switch member 33 which has a contact member 59 as shown in a normally opened condition. It is obvious that the brake switch member 33 in the closed condition is connected through a line 60 to a brake light assembly 61 and, additionally, to the control circuit 44.

The control circuit 44 includes a third or concealed switch member 62; a fourth switch or normally opened relay member 64; and a fifth switch or normally closed relay member 66. More particularly, the concealed switch member 62 in FIG. 2 is illustrated as in an opened condition and having lines 67 and 69 therefrom connected to the normally opened contacts 71 and 72 of the normally opened relay member 64. Additionally, the line 69 is connected through line 73 to the coil member 38 of the ignition assembly 22 for energizing the same. Additionally, the line 69 is connected by a line 75 to one side of a solenoid member 76 of the normally opened relay member 64. The other side of the solenoid member 76 is connected by a line 77 to a contact 79 of the normally closed relay member 66. It is seen that a contact lever member 81 of the normally closed relay member 66 is shown in a closed condition inter-connecting the contact 79 and a contact 83 which is connected to ground 51 and to a solenoid member 85 of the normally closed relay member 66. The other side of the solenoid member 85 is connected by line 86 to the brake switch member 33.

The ignition circuit 44 is illustrated as having the coil member 38 therewithin but, of course, the line 73 is connected through the coil member 38 to the distributor assembly 40, spark plugs, etc. needed for operation of the internal combustion engine.

In the use and operation of the auto warm-up theft preventing apparatus 12 of this invention, it is noted in FIG. 2 that on the closing of the ignition switch member 23 and the concealed switch member 62, the power supply is provided to the ignition circuit 46 or the coil member 38 through lines 53, 57, 69, and 73 regardless of the operation and positioning of the normally opened relay 64, normally closed relay 66, and operation of the brake switch member 33. Additionally, it is noted that the vehicle cannot be started on only closing of the ignition switch member 23 as the circuit through the lines 53, 57, 67, and 73 cannot pass through the normally opened relay 64. In fact, on starting the automobile, the ignition switch member 23 and concealed switch member 62 both need to be closed to energize the circuit to the coil member 38. This operates through line 69 to the solenoid member 76 to close the same so that the power circuit is also supplied through the contacts 71 and 72 to the coil member 38. This circuit is maintained as the normally closed relay 66 completes the circuit to ground 51.

Next, the concealed switch member 62 may be opened but the circuit is still maintained as the normally opened relay 64 through its solenoid member 76 is closed through contact points 79 and 83 of the normally closed relay 66. On one depressing the brake switch member 33, it is seen that the power supply is fed through lines 53 and 86 to the solenoid member 85 so as to move the contact lever member 81 downwardly into the opened condition. This thereupon releases the completed circuit to the solenoid member 76 of the normally opened relay 64 so that the same is de-energized and moved to the opened condition as shown in FIG. 2. Under this condition, with the cooperation with the opened concealed switch member 62, the circuit thereupon is disrupted to the coil member 38 and the vehicle is without power from the internal combustion engine which disables the same. At this point, the vehicle cannot be again started without knowledge of the location and closing of the concealed switch member 62 which is the function and desirability of this invention.

Although the control circuit means has been described as utilizing relays, it is noted that similar other circuit elements can be used such as transistor circuits and the like.

It is seen that the auto warm-up theft preventing apparatus of this invention is operable on the knowledge of one utilizing the same of the location of the concealed switch member so as to energize the vehicle for normal operation. After starting of the vehicle, it is noted that the concealed switch member is moved to the open condition whereupon one depressing the brake assembly operates to open the ignition system and thus disable the vehicle. This theft preventing apparatus is particularly desirable as the disabling of the vehicle occurs normally within a short period of time after movement as the operation of the brake assembly is frequently required. However, the operation of this theft preventing apparatus with its built in time delay presents a mysterious confusion to one not authorized to use the vehicle and it is very improbable that he would connect such disability to the brake assembly but instead would recognize an ignition failure and movement of the key member would not present any desirable results. In fact, use of the key member would present a completely dead engine without turning over the starter or the like. This theft preventing apparatus is particularly desirable on perhaps one taking the vehicle structure from its owner by force as he would be able to move the vehicle a short distance away from the victim who could then seek aid in regards to the stolen vehicle.

The auto warm-up theft preventing apparatus of this invention is desirable in that it allows one to energize the ignition system in an internal combustion engine with the key member mounted in the ignition switch member so as to warm-up the vehicle during winter operation without fear of having the vehicle stolen during such warm-up operation. Also, the theft preventing apparatus of this invention is economical to manufacture; simple to install on existing ignition systems; reliable in operation; and substantially maintenance free.

While the invention has been described in conjunction with preferred specific embodiments thereof, it will be understood this description is intended to illustrate and not to limit the scope of the invention, which is defined by the following claims.

I claim:

1. A theft preventing apparatus, comprising:
   a. a power supply,
   b. a first switch member connected to said power supply to receive current therefrom,
   c. a second switch member connected to said power supply to receive current therefrom,
   d. a control circuit connected to said first switch member and said second switch member and connected to an ignition circuit for energization of a vehicle,
   e. said control circuit having a third switch member, a fourth switch member, and a fifth switch member
   f. means for passing current from said first switch member to said third switch member to said ignition circuit; from said first switch member to said fourth switch member to said ignition circuit; and from said second switch member to said fifth switch member to said fourth switch member, whereby, under one set of conditions, said first switch member is operable in closed condition to energize said ignition circuit for normal vehicle operation and, under a second set of conditions, said third switch member in the opened condition with said first switch member and said fourth switch member in the closed condition operate to energize said ignition circuit and, under a third set of conditions, operation of said second switch member operates to open said fourth switch member and de-energize said ignition circuit.

2. A theft preventing apparatus as described in claim 1, wherein:
   a. said first switch member is an ignition switch operable by a key member to open and close the same, and
   b. said second switch member is a normally opened brake switch member operated by a brake pedal assembly to de-energize said fourth switch member and open said means for passing current from said first switch member to said fourth switch member to said ignition circuit to de-energize said ignition circuit.

3. A theft preventing apparatus as described in claim 2, including:
   a. said third switch member is mounted in a concealed position in the vehicle whereupon its movement to its normally closed condition is required in combination with closing of said ignition switch member to energize the ignition circuit for normal operation,
   b. said third switch member in the closing condition is operable to move said fourth switch member from the normal opened condition to the closed condition whereupon the ignition circuit is energized through said fourth switch member regardless of the positioning of the third switch member,
   c. said fifth switch member is operable in its normally closed condition to hold said fourth switch member in the closed condition to energize said ignition circuit, and
   d. said fifth switch member is moved from its normally closed condition to the opened condition to de-energize said fourth switch member on actuation of said brake switch member to de-energize said ignition circuit which thereupon can not be energized without actuation of the concealed said third switch member.

4. A theft preventing apparatus as described in claim 3, wherein:
   a. said fourth switch member is a normally opened relay member having its contacts moved to the closed condition on energization of said third switch member and in combination with said fifth switch member, and
   b. said fifth switch member is a normally closed relay member moved to the opened condition on closure of said brake switch member which, in turn, de-energizes said normally opened relay member.

* * * * *